(12) United States Patent
Cherian

(10) Patent No.: US 8,775,736 B2
(45) Date of Patent: Jul. 8, 2014

(54) SYSTEM AND METHOD FOR ENHANCED APPLICATION PERFORMANCE WITH TIERED STORAGE IN AN INFORMATION HANDLING SYSTEM

(75) Inventor: Jacob Cherian, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 572 days.

(21) Appl. No.: 12/582,270

(22) Filed: Oct. 20, 2009

(65) Prior Publication Data

US 2011/0093670 A1  Apr. 21, 2011

(51) Int. Cl.
*G06F 12/14* (2006.01)

(52) U.S. Cl.
USPC .......... 711/117; 711/156; 711/161; 711/162; 726/24

(58) Field of Classification Search
None
See application file for complete search history.

(56) References Cited

U.S. PATENT DOCUMENTS

2007/0240216 A1   10/2007  O'Sullivan et al.
2008/0082768 A1*  4/2008  Dunlop et al. ................. 711/161
2008/0263277 A1* 10/2008  Matsunami et al. .......... 711/117
2009/0089880 A1*  4/2009  Kobayashi et al. ............. 726/24
2011/0145528 A1*  6/2011  Watanabe et al. ............. 711/162

OTHER PUBLICATIONS

Touchette, "Anti-Virus Operations in the VDI World," NetApp Blogs—The Virtualization Effect, Nov. 24, 2008 http://blogs.netapp.com/virtualization/2008/11/anti-virus-oper.html.

* cited by examiner

*Primary Examiner* — Matthew Bradley
*Assistant Examiner* — Alan Otto
(74) *Attorney, Agent, or Firm* — Larson Newman, LLP

(57) ABSTRACT

An information handling system includes a memory controller coupled to a first and a second storage device. The memory controller stores information on the first storage device based upon an access count related to the information, stores other information on the second storage device based upon a another access count related to the other information, and stores access data including the access counts. The information handling system also includes a processing system coupled to the memory controller. The processing system obtains the access data from the memory controller, and determines to perform an operation on the data based upon the access count, and to not perform the operation on the other data based upon the other access count.

18 Claims, 3 Drawing Sheets

SYSTEM AND METHOD FOR ENHANCED APPLICATION PERFORMANCE WITH TIERED STORAGE IN AN INFORMATION HANDLING SYSTEM

FIELD OF THE DISCLOSURE

This disclosure relates generally to information handling systems, and relates more particularly to data storage systems in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

An information handling system can include a tiered data storage system. A tiered data storage system typically places often used data into relatively fast but expensive storage media, and places less often used data into slower, less expensive storage media. Tiered data storage systems can be a cost effective way of storing data in an information handling system. A tiered data storage system can include a combination of non-volatile random access memory (NVRAM) such as FLASH or other non-volatile storage, disk storage, tape backup storage, or other data storage media.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
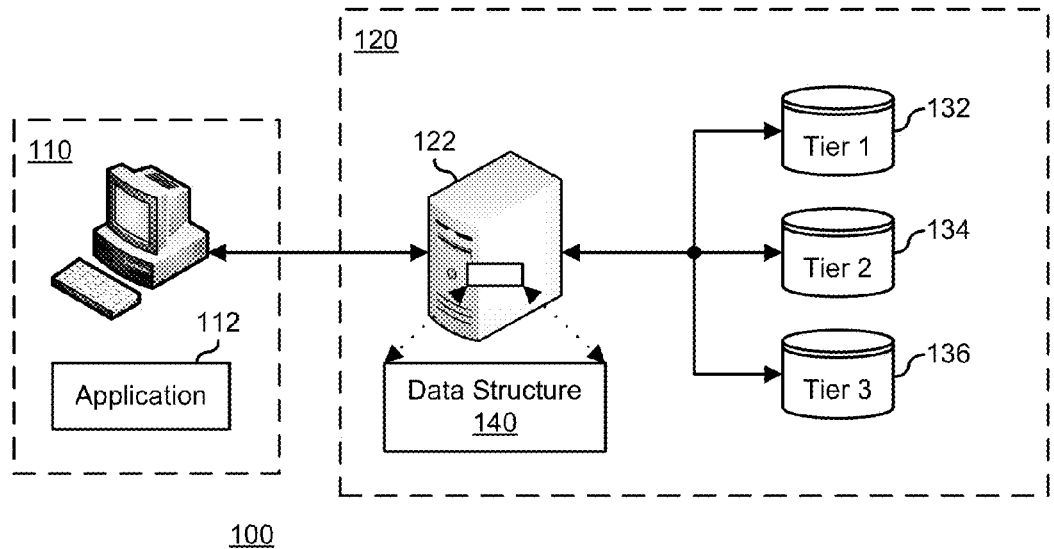
FIG. 1 is a functional block diagram of an embodiment of an information handling system with a tiered data storage system.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile such as random-access memory), nonvolatile such as read-only memory or flash memory) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

An information handling system can include a host processing system and a tiered data storage system. In a particular embodiment, described herein, the host processing system writes data to, and reads data from the tiered data storage system. The tiered data storage system manages data storage such that different portions of the data are stored in different devices, based on predetermined selection criteria. The selection criteria can relate to the frequency a particular portion of the data is accessed by the host processing system. The tiered data storage system creates and maintains allocation metadata structures that include metadata pertaining to which portions of the data are stored in which devices and the frequency of access to the data such that portions of data can be moved between the tiers to provide improved performance.

FIG. 1 illustrates an information handling system 100 according to an embodiment of the present disclosure, including a host processing system 110 and a tiered storage system 120. Host processing system 110 includes an application 112. Tiered storage system 120 includes one or more storage controllers 122 attached to storage devices 132, 134, and 136 which may be in different tiers. Storage controller 122 includes a data structure 140 that supports the tiering process. Data structure 140 can be stored in a memory device in storage controller 122. Where tiered storage system 120 includes more than one storage controller 122, a consistent view of data structure 140 is maintained between the more than one storage controllers 122. Storage media 132, 134, and 136 are labeled "Tier 1," "Tier 2," and "Tier 3," respectively, and can include other storage media (not illustrated). Host processing system 110 is adapted to transfer data to and from storage controller 122 over an interface such as a Small Computer System Interface (SCSI), a Peripheral Component Interconnect (PCI) Express interface, or another data communication interface. In a particular embodiment, storage media 132 provides fast data access, storage media 134 provides medium data access, and storage media 136 provides slow data access. For example, storage media 132 can be an NVRAM, another fast data access storage media, or a combination thereof; storage media 134 can be a disk array, another medium data access storage media, or a combination thereof; and storage media 136 can be a tape device, another slow data access storage media, or a combination thereof. The terms fast-, medium-, and slow-data access are relative terms, and the actual data access speed will depend on the data access speeds of the respective storage media 132, 134, and 136.

Figure 2:
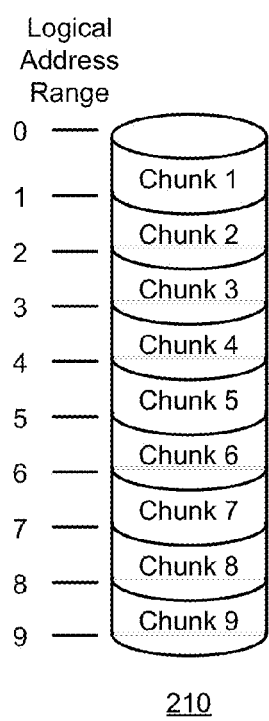
FIG. 2 is an illustration of data storage management in the tiered data storage system of FIG. 1.

In operation, storage controller 122 manages data storage for information handling system 100 on storage devices 132, 134, and 136 as illustrated in FIG. 2. Storage controller 122 performs memory reads and writes for host processing system 110. Storage controller 122 presents the data stored in storage devices 132, 134, and 136 as a logical address range 210 consisting of uniquely addressable contiguous locations. Address range 210 provides host processing system 110 with logical address ranges, labeled as "0" through "9", to which host processing system 110 can write data, and from which host processing system 110 can read data. The logical address range of 0 through 9 is representative of a storage logical unit accessible by host processing system 110, and can represent a small storage logical unit as may be typical of a mobile computing device or personal computer, such as a storage logical unit of 1 to 500 gigabytes, or a large storage logical unit as may be typical of a large network server farm or data storage network, such as a storage logical unit of many petabytes or more.

Storage controller 122 divides the logical address range of address range 210 into a number of substantially equal sized chunks 1 through 9, each chunk 1 through 9 including the data from a corresponding logical address range. As such, chunk 1 stores the data from the logical address range of 0 to 1, chunk 2 stores the data from the logical address range of 1 to 2, and so on. Storage controller 122 includes a metadata structure, as shown in Table 1, which includes an entry for each of chunks 1 through 9. The metadata structure can be a part of data structure 140, and includes an access count for each chunk, as shown in the third column. The access count can be further broken down into separate counts for the number of data reads and writes for each chunk, as shown in the fourth column. The access count is a tracking of the number of times each chunk 1 through 9 is accessed for data reads and data writes in a particular amount of time, as, for example, in an hour, or in a day, or in another amount of time. The chunks 1 through 9 are representative, and storage controller 122 can divide address range 210 into more or less than nine chunks.

TABLE 1

Metadata Structure

| Chunk | Address Range | Access Count | Reads/ Writes | Tier | Storage Media |
|---|---|---|---|---|---|
| 1 | 0-1 | 236 | 13/223 | 1 | 132 |
| 2 | 1-2 | 0 | 0/0 | 3 | 136 |
| 3 | 2-3 | 27 | 15/12 | 3 | 136 |
| 4 | 3-4 | 95 | 0/95 | 2 | 134 |
| 5 | 4-5 | 392 | 271/121 | 1 | 132 |
| 6 | 5-6 | 17 | 17/0 | 3 | 136 |
| 7 | 6-7 | 168 | 75/93 | 1 | 132 |
| 8 | 7-8 | 104 | 99/5 | 2 | 134 |
| 9 | 8-9 | 63 | 63/0 | 2 | 134 |

Application 112 functions to operate on the data in storage devices 132, 134, and 136 in a predetermined way. A non-limiting example of the way in which application 112 can operate on the data in storage array 112 includes scanning the data for viruses, archiving unused or seldom used data to a long term storage system (not illustrated), backing up often used data to a back-up storage system (not illustrated), maintaining data consistency between storage devices 132, 134, and 136 and a mirror data storage system (not illustrated), another data operation, or a combination thereof. By accessing data structure 140, and in particular, a metadata structure similar to Table 1, application 112 can determine particular logical address ranges or chunks to operate on, and other particular logical address ranges or chunks to ignore.

In a particular example, application 112 can include an anti-virus program. Such an anti-virus program can function to scan files that have been written to in a particular amount of time, as, for example, in an hour, or in a day, or in another amount of time. Thus, application 112 can obtain information as to which chunks have been written to in the particular amount of time by viewing a metadata structure in data structure 140. Using Table 1 as an example, application 112 can determine that chunks 2, 6, and 9 have all had zero write accesses in the particular amount of time, and thus the anti-virus program can determine to not scan chunks 2, 6, and 9. Then, when the anti-virus program initiates a scan, the data in address range 210 with logical addresses of 0-1, 2-5, and 6-8 can be scanned and the data with logical addresses of 1-2, 5-6, and 8-9 can be excluded from the scan, thus decreasing the time necessary to scan for viruses, as compared to scanning all of the data.

In another example, application 112 can include an archive program that functions to move files that have not been accessed often in a particular amount of time to a long term storage system. Again, application 112 can obtain the access count information from a metadata structure. For example, if an archive program moves files that have been read fewer than 20 times, and have not been written to, then using Table 1 as an example, application 112 can determine that chunks 2 and 6 can be archived without having to scan the individual files in chunks 2 and 6, and the archive program's performance is improved, as compared to having to scan all files.

Figure 3:
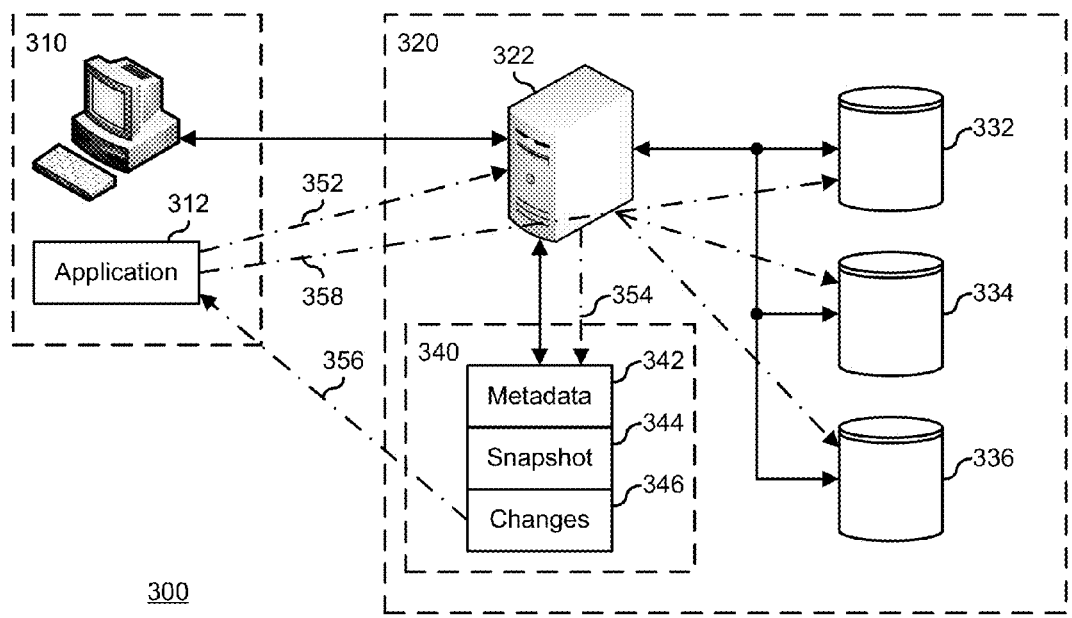
FIG. 3 is a functional block diagram of another embodiment of an information handling system with a tiered data storage system.

FIG. 3 illustrates an information handling system 300, similar to information handling system 100, according to an embodiment of the present disclosure. Information handling system 300 includes a host processing system 310 similar to host processing system 110 and a tiered storage system 320 similar to tiered storage system 120. Host processing system 310 includes an application 312 similar to application 112. Tiered storage system 320 includes a storage controller 322 similar to storage controller 122. Storage controller 322 includes a data structure 340. Tiered storage system 320 includes storage media 332, 334, and 336, similar to storage media 132, 134, and 136, and providing fast-, medium-, and slow data access, respectively. Data structure 340 includes a metadata structure 342, a snapshot structure 344, and a changes structure 346.

In operation, storage controller 322 manages data storage for information handling system 300 on storage devices 332, 334, and 336 as described above with respect to FIG. 2 and Table 1. Here, the metadata structure described in Table 1 is included in metadata structure 342, where storage controller 322 retains the current metadata information. In addition, storage controller 322 includes snapshot structure 344 that retains metadata information from a particular earlier time. Storage controller 322 also compares the metadata in metadata structure 342 with the metadata information in snapshot structure 344 and records the differences in changes structure 346. Thus, for example, at a first time, storage controller 322 can place the current metadata information into snapshot structure 344. Then, at a later time, storage controller 322 can compare the later metadata information from metadata structure 342 with the earlier metadata information from snapshot structure 344, and record the differences in changes structure 346.

Application 312 functions to operate on the data in storage devices 332, 334, and 336 as described above. Thus application 312 can operate by scanning the data for viruses, archiving data, backing up data, maintaining data consistency, performing another operation, or a combination thereof. In a particular embodiment, application 312 sends a command 352 to storage controller 322, indicating that application program 312 is preparing to operate on the data in storage array 320. In response, storage controller 322 initiates a command 354 to compare the metadata information in metadata structure 342 with the metadata information in snapshot structure 344 and record the differences in changes structure 346. Storage controller 322 then sends the change information 356 to application 312. Based upon the change information, application 312 performs an operation 358 on the data in storage devices 332, 334, and 336.

In another embodiment (not illustrated), application 312 reads change structure 346 to obtain the change information. In another embodiment (not illustrated), application 312 reads metadata structure 342, and retains the metadata information in a snapshot structure similar to snapshot structure 344. At a later time, application 312 reads metadata structure 342 again, and compares the later metadata information with the earlier metadata information in its snapshot structure and records the differences in a changes structure similar to changes structure 346. Application 312 then operates on the data in storage devices 332, 334, and 336 based upon the change information.

Figure 4:
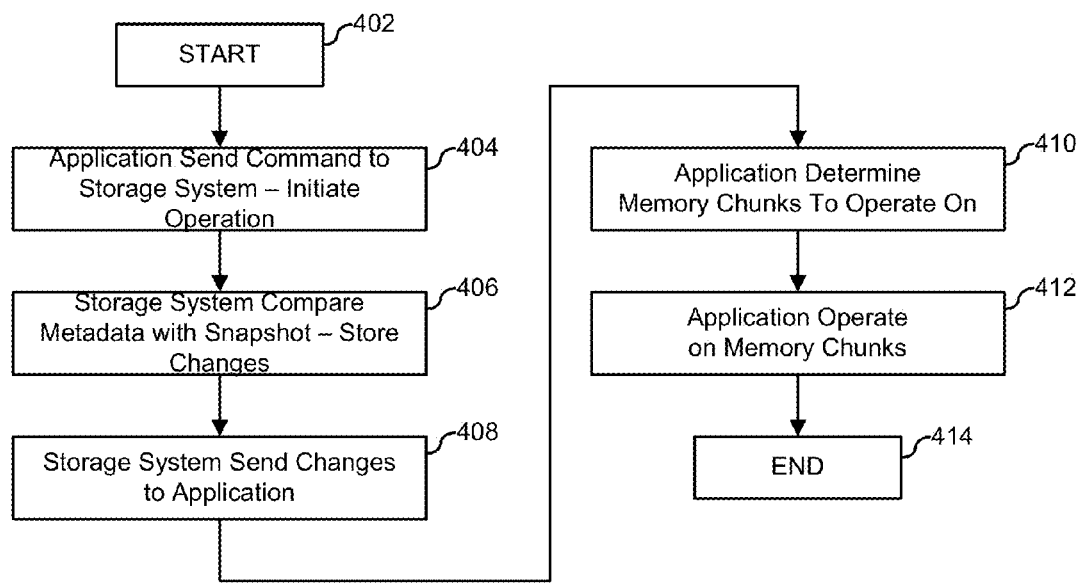
FIG. 4 is a flow chart illustrating a method of implementing a system for enhanced application performance with a tiered data storage system.

FIG. 4 illustrates a method of implementing a system for enhanced application performance with tiered storage in a flowchart form, in accordance with an embodiment of the present disclosure. The method starts at block 802. An application in a processing system sends a command to a storage system, indicating that the application is initiating an operation on the storage system in block 404. For example, application 312 can communicate to storage controller 322 that application 312 is initiating an anti-virus scan of the data stored in storage devices 332, 334, and 336. The storage system compares the metadata for the present status of the storage system with a snapshot of the metadata for a previous status of the storage system, and stores the comparison information in block 406. Thus, storage controller 322 can compare the contents of metadata structure 342 with the contents of snapshot structure 344, and store the change information in change structure 346. The storage system sends the comparison information to the application in block 408. As such, storage controller 322 can send the contents of change structure 346 to application 312. Based upon the comparison information, the application determines which memory chunks on which to perform the operation in block 410. For example, application 312 can determine logical address ranges in address range 210 on which to perform the virus scan, based upon the contents of change structure 346. The application performs the operation on the chosen memory chunks in block 412, and processing ends in block 414. Thus, application 312 can scan the chosen chunks in storage devices 332, 334, and 336.

Figure 5:
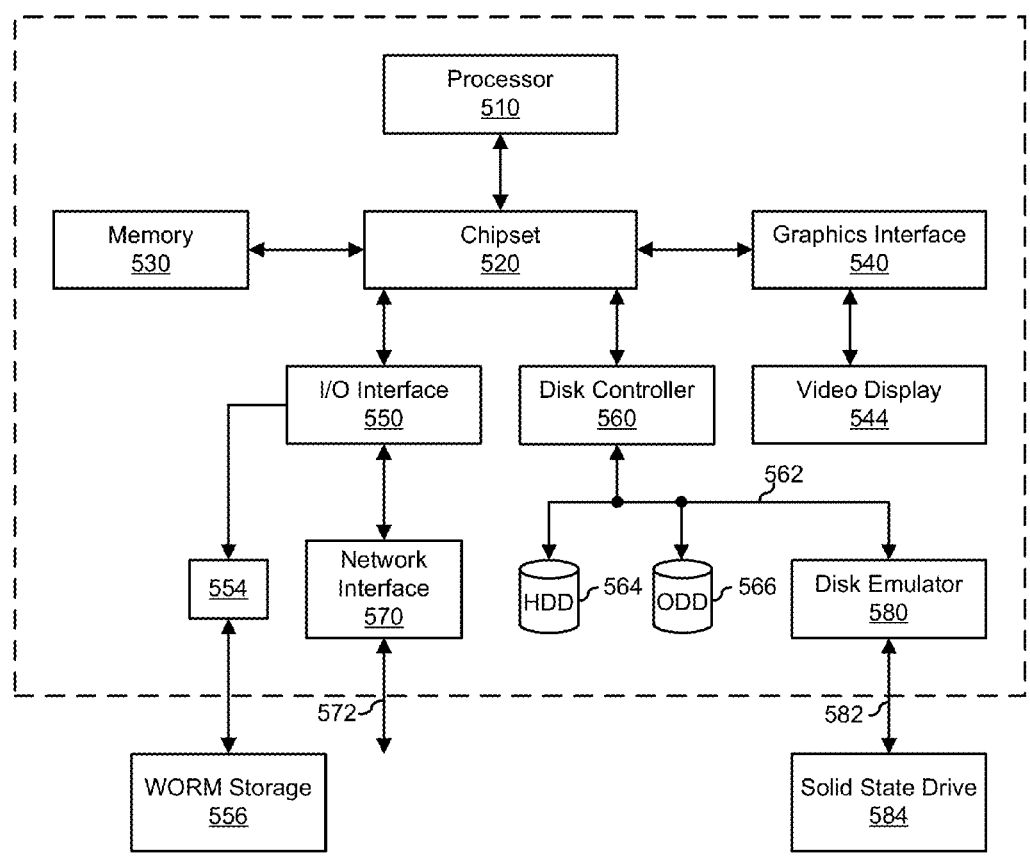
FIG. 5 is a functional block diagram illustrating an exemplary embodiment of an information handling system.

In a particular embodiment, an information handling system can be used to carry out one or more of the methods described above. In another embodiment, one or more of the systems described above can be implemented in the form of an information handling system. FIG. 5 illustrates a functional block diagram of an embodiment of an information handling system, generally designated as 500. Information handling system 500 includes processor 510, a chipset 520, a memory 530, a graphics interface 540, an input/output (I/O) interface 550, a disk controller 560, a network interface 570, and a disk emulator 580.

Processor 510 is coupled to chipset 520. Chipset 520 supports processor 510, allowing processor 510 to process machine-executable code. In a particular embodiment (not illustrated), information handling system 500 includes one or more additional processors, and chipset 520 supports the multiple processors, allowing for simultaneous processing by each of the processors, permitting the exchange of information between the processors and the other elements of information handling system 500. Processor 510 can be coupled to chipset 520 via a unique channel, or via a bus that shares information between processor 510, chipset 520, and other elements of information handling system 500.

Memory 530 is coupled to chipset 520. Memory 530 can be coupled to chipset 520 via a unique channel, or via a bus that shares information between chipset 520, memory 530, and other elements of information handling system 500. In particular, a bus can share information between processor 510, chipset 520 and memory 530. In a particular embodiment (not illustrated), processor 510 is coupled to memory 530 through a unique channel. In accordance with another aspect (not illustrated), an information handling system can include a separate memory dedicated to each of the processors. A non-limiting example of memory 530 includes static, dynamic. Or non-volatile random access memory (SRAM, DRAM, or NVRAM), read only memory (ROM), flash memory, another type of memory, or any combination thereof.

Graphics interface 540 is coupled to chipset 520. Graphics interface 540 can be coupled to chipset 520 via a unique channel, or via a bus that shares information between chipset 520, graphics interface 540, and other elements of information handling system 500. Graphics interface 540 is coupled to a video display 544. Other graphics interfaces (not illustrated) can also be used in addition to graphics interface 540 if needed or desired. Video display 544 can include one or more types of video displays, such as a flat panel display or other type of display device.

I/O interface 550 is coupled to chipset 520. I/O interface 550 can be coupled to chipset 520 via a unique channel, or via a bus that shares information between chipset 520, I/O interface 550, and other elements of information handling system 500. Other I/O interfaces (not illustrated) can also be used in addition to I/O interface 550 if needed or desired. I/O interface 550 is coupled to one or more add-on resources 554. Add-on resource 554 is connected to a tiered storage system 556, similar to tiered storage system 120, and can also include another data storage system, a graphics interface, a network interface card (NIC), a sound/video processing card, another suitable add-on resource or any combination thereof.

Network interface device 570 is coupled to I/O interface 550. Network interface 570 can be coupled to I/O interface 550 via a unique channel, or via a bus that shares information between I/O interface 550, network interface 570, and other elements of information handling system 500. Other network interfaces (not illustrated) can also be used in addition to network interface 570 if needed or desired. Network interface 570 can be a network interface card (NIC) disposed within information handling system 500, on a main circuit board (e.g., a baseboard, a motherboard, or any combination thereof), integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Disk controller 560 is coupled to chipset 510. Disk controller 560 can be coupled to chipset 520 via a unique channel, or via a bus that shares information between chipset 520, disk controller 560, and other elements of information handling system 500. Other disk controllers (not illustrated) can also be used in addition to disk controller 560 if needed or desired. Disk controller 560 can include a disk interface 562. Disk controller 560 can be coupled to one or more disk drives via disk interface 562. Such disk drives include a hard disk drive (HDD) 564 or an optical disk drive (ODD) 566 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 560 can be coupled to disk emulator 580. Disk emulator 580 can permit a solid-state drive 584 to be coupled to information handling system 500 via an external interface. The external interface can include industry standard buses (e.g., USB or IEEE 1384 (Firewire)) or proprietary busses, or any combination thereof. Alternatively, solid-state drive 584 can be disposed within information handling system 500.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a tiered storage system including a memory controller coupled to a first memory storage device, to a second memory storage device, and to a third memory storage device, the memory controller operable to:
determine a first access count for first information stored on the tiered storage system, the first access count corresponding to how many times the first information is accessed in the tiered storage system;
determine a second access count for second information stored on the tiered storage system, the second access count corresponding to how many times the second information is accessed in the tiered storage system;
determine a third access count for third information stored on the tiered storage system, the third access count corresponding to how many times the third information is accessed in the tiered storage system;
store the first information on the first memory storage device based upon the first access count being greater than the second access count;
store the second information on the second memory storage device based upon the second access count being less than the first access count;
store the third information on the third memory storage device based upon the third access count being less than the second access count; and
store first access data comprising the first, second, and third access counts; and
a host processing system coupled to the memory controller and operable to:
obtain the first access data from the memory controller;
determine to perform an operation on the first information based upon the first access count, to not perform the operation on the second information based upon the second access count, and to not perform the operation on the third information based upon the third access count; and
perform the operation on the first information on the first storage device;
wherein the first access count, the second access count, and the third access count comprise counts of read accesses and of write accesses.

2. The information handling system of claim 1 the memory controller further operable to:
store second access data comprising a fourth access count related to the first information, a fifth access count related to the second informations, and a sixth access count related to the third information;
compare the second access data with the first access data; and
store comparison data related to the comparison of the second access data with the first access data.

3. The information handling system of claim 1 the host processing system further operable to:
obtain the comparison data from the memory controller; and
determine to perform the operation on the first data based upon the comparison data.

4. The information handling system of claim 1 wherein:
the first access count includes a first number of times the first information was written to the first memory storage device;
the second access count includes a second number of times the second information was written to the second memory storage device; and
the third access count includes a third number of times the third information was written to the third memory storage device.

5. The information handling system of claim 4 wherein the operation includes a virus scan operation.

6. The information handling system of claim 1 wherein:
the first access count includes a first number of times the first information was read from the first memory storage device;
the second access count includes a second number of times the second information was read from the second memory storage device; and
the third access count includes a third number of times the third information was read from the third memory storage device.

7. A method comprising:
determining a first access count for first information associated with a first logical address range and stored on a tiered storage system, the first access count corresponding to how many times the first information is accessed in the tiered storage system;
determining a second access count for second information associated with a logical second address range and stored on the tiered storage system, the second access count corresponding to how many times the second information is accessed in the tiered storage system;
storing the first information in a first chunk of a first memory storage device of the tiered storage system based upon the first access count being greater than the second access count;
storing the second information in a second chunk of a second memory storage device of the tiered storage system based upon the second access count being less than the first access count;
storing first access data comprising the first and second access counts on a memory controller;
determining to perform an operation on the first chunk based upon the first access count, and to not perform the operation on the second chunk based upon the second access count; and
performing the operation on the first chunk on the first storage device;
wherein the first access count and the second access count comprise counts of read accesses and of write accesses.

8. The method of claim 7 further comprising:
storing second access data comprising a third access count related to the first information and a fourth access count related to the second information;
comparing the second access data with the first access data; and
storing comparison data related to the comparison of the second access data with the first access data.

9. The method of claim 8 further comprising determining to perform the operation on the first data based upon the comparison data.

10. The method of claim 7 wherein:
the first access count includes a first number of times the first information was written to the first memory storage device; and
the second access count includes a second number of times the second information was written to the second memory storage device.

11. The method of claim 10 wherein the operation includes a virus scan operation.

12. The method of claim 7 wherein:
the first access count includes a third number of times the first information was read from the first memory storage device; and
the second access count includes a fourth number of times the second information was read from the second memory storage device.

13. The method of claim 7 wherein performing the operation includes moving the first information from the first memory storage device to a third memory storage device.

14. Machine-executable code for an information handling system comprising a first resource, wherein the machine-executable code is embedded within a non-transitory medium and includes instructions for carrying out a method comprising:
determining a first access count for first information stored on a tiered storage system, the first access count corresponding to how many times the first information is accessed in the tiered storage system;
determining a second access count for second information stored on the tiered storage system, the second access count corresponding to how many times the second information is accessed in the tiered storage system;
determining a third access count for third information stored on the tiered storage system, the third access count corresponding to how many times the third information is accessed in the tiered storage system:
storing the first information on a first memory storage device based upon the first access count being greater than the second access count;
storing the second information on a second memory storage device based upon the second access count being less than the first access count;
storing the third information on a third memory storage device based upon the third access count being less than the second access count:
storing first access data comprising the first, second access, and third access counts on a memory controller;
determining to perform an archive operation on the first information based upon the first access count, to not perform the operation on the second information based upon the second access count, and to not perform the operation on the third information based upon the third access count; and
performing the archive operation on the first information in response to determining to perform the first operation;
wherein the first access count and the second access count comprise counts of read accesses and of write accesses.

15. The machine-executable code of claim 14 wherein the method further comprises:
storing second access data comprising a fourth access count related to the first information, a fifth access count related to the second information, and a sixth access count related to the third information;
comparing the second access data with the first access data;
storing comparison data related to the comparison of the second access data with the first access data; and
determining to perform the operation on the first data based upon the comparison data.

16. The machine-executable code of claim 14 wherein:
the first access count includes a first number of times the first information was written to the first memory storage device; and
the second access count includes a second number of times the second information was written to the second memory storage device.

17. The machine-executable code of claim 14 wherein:
the first access count includes a third number of times the first information was read from the first memory storage device; and
the second access count includes a fourth number of times the second information was read from the second memory storage device.

18. The information handling system of claim 1 wherein:
the first memory storage device comprises a non-volatile random access memory;
the second memory storage device comprises a disk array; and
the third memory storage device comprises a tape device.

* * * * *